July 18, 1972         M. H. EARING         3,677,995

EPOXY RESIN CEMENT

Original Filed Sept. 20, 1967         3 Sheets-Sheet 1

INVENTOR
MASON H. EARING

BY *Jon Carl Sealow*

ATTORNEY

July 18, 1972  M. H. EARING  3,677,995
EPOXY RESIN CEMENT
Original Filed Sept. 20, 1967  3 Sheets-Sheet 2

INVENTOR
MASON H. EARING

BY
ATTORNEY 3,677,995
EPOXY RESIN CEMENT
Mason H. Earing, Danville, Ill., assignor to General Electric Company
Continuation-in-part of application Ser. No. 29,765, Apr. 27, 1970, which is a continuation of application Ser. No. 699,252, Sept. 20, 1967. This application July 7, 1970, Ser. No. 52,953
Int. Cl. C08g 51/04
U.S. Cl. 260—37 EP
20 Claims

ABSTRACT OF THE DISCLOSURE

A thermosetting epoxy compound is provided comprising a first mix of glycidyl ether of polyhydric phenols and a cycloaliphatic polyepoxy resin in the ratio of about 1:4 to 3:2 and a suitable thixotropic agent. A suitable filler to improve the physical properties of the compound may be incorporated into the first mix. To this is admixed a second mix comprising a curing agent of a boron trifluoride amine complex dissolved in a polyfunctional hydroxylic solvent in sufficient quantity so that the gelation time is substantially independent of the quantity of curing agent. The resulting admixed compound is thixotropic and exhibits a relatively rapid gelation time which occurs at room temperature.

---

Figure 1:
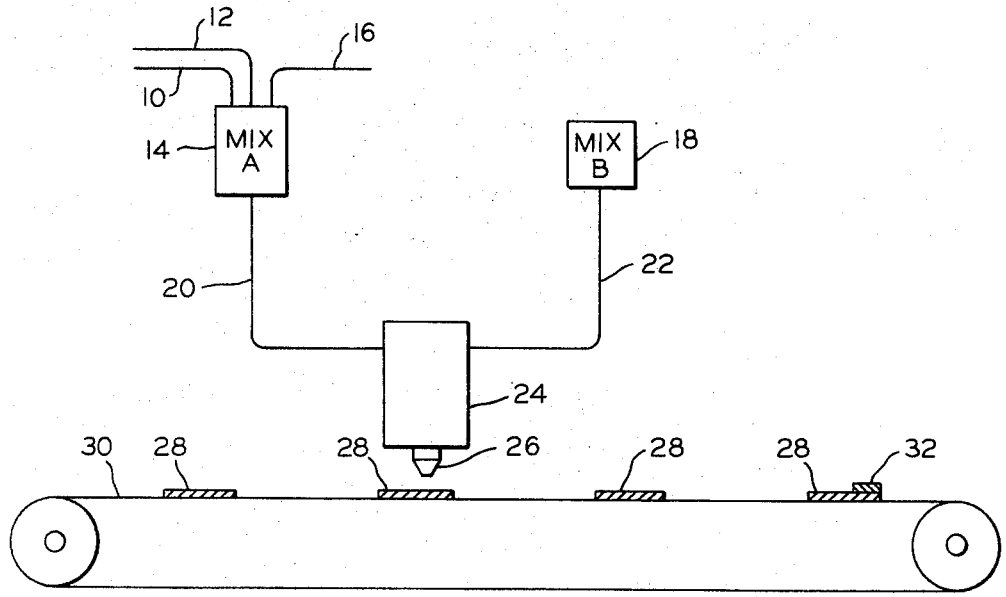

This is a continuation-in-part application of the application filed on Apr. 27, 1970, bearing Ser. No. 29,765, now abandoned which was a continuation of the application bearing Ser. No. 669,252, filed Sept. 20, 1967, now abandoned.

This invention relates to an epoxy resin compound. In its more specific aspect, this invention relates to an epoxy cement comprising an epoxy resin compound characterized by a gelation time which can be adjusted continuously.

Epoxy cements having various cure systems are used extensively for bonding multifarious types of materials. One common epoxy resin compound in wide use is formed as the reaction product between an epihalohydrin and a polyhydric phenol, such as bisphenol, to form diglycidyl ether of polyhydric phenols. The resin is curable at room temperature with an amine type curing agent or cross-linking agent such as aniline, or with a boron trifluoride amine complex. Resin compounds of the amine type are generally undesirable in that the mechanical strength of the cured or cross-linked product is seriously impaired at temperatures above 80° C. A further disadvantage of both types is that each such curing agent has a specified gelation time at a given temperature as determined by its reaction rate with the epoxy resin. That is, for each compound the gelation time at a particular temperature is essentially fixed. This limitation is especially important where, in assembly-line production, the resin is applied to an article on a relatively short conveyor belt and should substantially cure or gel while in transit and before further handling. The gelation time is not only influenced by certain extraneous factors such as ambient temperature, but by changes in manufacturing operations or conditions as well. In order to change the cure time to accommodate for changes in specifications or conditions, an entirely different curing agent having the desired gelation time must be incorporated into the resin compound. Therefore, amine cured epoxy resins in high volume production are severely limited because the gelation time can only be adjusted discontinuously by changing the curing agent. Quite obviously, this is disadvantageous not only because there is a limited number of such curing agents, but also because it necessitates frequent interruptions of production.

The cycloaliphatic polyepoxy resins, which also are in common use as cement compounds, may be cured at room temperature with the boron trifluoride amine complex. However, the galation time is not only influenced by the ambient temperature, and therefore has the disadvantages discussed above, but further is dependent strongly on the amount of curing agent. Therefore, the mixing dispensers must be extremely accurate which, on a commercial scale, is normally not realized.

In assembly-line production, the epoxy resin and curing agent are separately metered to suitable mixing and dispensing equipment, and therefore the resin should have a relatively low viscosity. However, when the epoxy resin, comprising resin, curing agent, and generally other additives, is dispensed, the resulting compound must be sufficiently viscous so as not to run or flow from the position applied, for example, when applied to a vertical surface. These viscosity requirements, therefore, seriously limit the epoxy compounds which can be used as a cement in high volume production.

The purpose of this invention, therefore, is to provide an epoxy resin compound having a gelation time which can be adjusted continuously, and is especially useful in high volume assembly-line production.

In accordance with the broad aspect of my invention, I form an epoxy cement by providing a thermosetting resinous mixture comprising a glycidyl ether of polyhydric phenols and a cycloaliphatic polyepoxy resin in the ratio of about 1:4 to 3:2 and a suitable thixotropic agent. A curing agent comprising a boron trifluoride amine complex, which has been dissolved in a polyfunctional hydroxylic solvent, is incorporated into the resinous mixture at least in sufficient quantity so that the gelation time is substantially independent of the quantity of the curing agent. The resulting epoxy resin compound is thixotropic and, therefore, will not run from its applied position, and further exhibits a relatively rapid gelation time which occurs at room temperature and substantially independent of the ambient temperature.

I have discovered that by reason of my invention the gelation time for the epoxy resin compound is dependent on the ratio of the two resins to each other, and, therefore, may be adjusted by adjusting this ratio. That is, the amount of curing agent is provided in sufficient quantity so that the gelation time is relatively independent of the concentration, and preferably is provided in slight excess of that required to polymerize the epoxy resins. In this manner, the gelation time may be adjusted continuously by simply adjusting the ratio of the two resins with the range specified rather than changing curing agents. This is especially significant in commercial operations where the ambient temperature fluctuates and manufacturing operations and conditions may vary.

In preparing the cement, two distinct epoxy resins are utilized, both of which are well known in the art and by themselves form no part of this invention. The epoxy resin of polyglycidyl ether of polyhydric phenols is commonly made by the reaction between epichlorhydrin (a diglycidyl ether) and bisphenol A, and although the invention is described hereinafter with particular reference to an epoxy formed from these materials, it should be understood that other starting materials may be used as well. This class of resins is represented by the general formula:

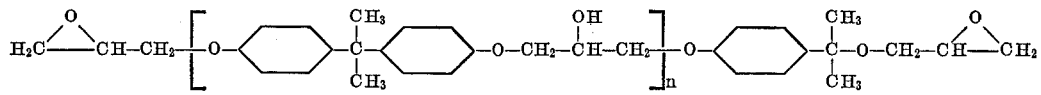

where $n$ has an average value ranging from zero to about ten. Such epoxy resins are sold under the tradenames of Epon by Shell Chemical Corp. and Araldite by Ciba Company. The cycloaliphatic polyepoxy resin is also well known, and generally comprises a five or six member ring and contains at least two epoxide groups such as described in U.S. Pat. No. 3,379,653. A particularly suitable cycloaliphatic polyepoxy resin is an alicyclic diepoxy adipate such as 1-hydroxymethyl-3,4-oxa-6 methyl cyclohexane, sold under the trade name of Araldite CY–178, and has the following structural formula:

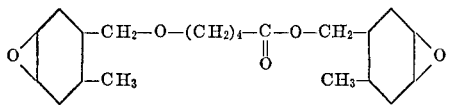

The ratio of diglycidyl ether of polyhydric phenols to cycloaliphatic polyepoxy resin is in the range of from about 1:4 to 3:2. When a suitable curing agent is incorporated into the resinous mixture in sufficient quantity to effect polymerization, it was found that the gelation time may be adjusted by adjusting the ratio of the two resins within the range specified. Thus, the gelation time is relatively independent of curing agent concentration and further is not influenced by ambient temperature. When more than the specified amount of diglycidyl ether of polyhydric phenols is used, the gelation time is too slow for most practical operations. On the other hand, if less amount of diglycidyl ether of polyhydric phenols is used, the gelation time is too rapid thereby inhibiting adequate mixing and dispensing. A resinous mixture having the ratio of two resins specified exhibits a gelation time of about thirty seconds to thirty minutes, but this can vary depending on such factors as the type of resin and/or curing agent used.

The thixotropic agent employed in the resin compound of this invention should be capable of imparting thixotropic properties to the resin compound upon coacting with the polyfunctional hydroxylic solvent. For this purpose, it has been found that pyrogenic silica, which is formed by the pyrolysis of silicon tetrachloride, is especially desirable. A particularly suitable grade of pyrogenic silica is sold under the tradename of Cab-O-Sil by Cabot Corporation. This silica has a particle size of 0.015 micron, a surface area of 200 square meters per gram, a specific gravity of 2.2 and a refractive index of 1.46. The solvent selected for the curing agent should properly coact with the thixotropic agent to substantially increase the viscosity of the resin compound. Solvents which can be employed in this invention include the polyether polyols such as polyoxyethylene triols, polyoxypropylene triols, polyoxbutylene triols, and mixtures thereof, and polyhydric alcohols, such as glycerine, ethylene glycol and hexamethylene glycol. In the preferred embodiment, glycerine and pyrogenic silica are used in the resin system and impart the desired thixotropy to the resin compound.

As stated above, the boron trifluoride amine complex, which effects substantial curing of the epoxy resin, is initially dissolved in the polyfunctional hydroxylic solvent. The amine radical of the complex may be, for example, aniline, m-chloroaniline, p-toluidine, o-toluidine, 2,6-diethylaniline and N,N'-diethylaniline. It is desirable that the complex has an activation temperature of 60 to 130° C. The activation temperature, which specifies the reactivity of the curing agent, is defined as the temperature at which diglycidyl ether of bisphenol A, when cured with the boron trifluoride amine complex, gels in one to two minutes. The lower the activation temperature, the more rapidly geltaion occurs, and therefore the curing agent should be selected with some discretion to accommodate production needs and environment.

There is illustrated schematically in FIG. 1 a technique for the manufacture and application of the resin compound to a high volume, assemblyline production. As stated above, the epoxy resin compound must be thixotropic so as not to run from its applied position. On the other hand, it is essential to be able to pump and meter the ingredients to the dispensing apparatus. For this reason, the cement is formed from two separate parts or mixes which are admixed just prior to being dispensed. In the first Mix A, the two resins, diglycidyl ether of polyhydric phenols and cycloaliphatic polyepoxy resin are fed via lines 10 and 12, respectively, to vessel 14 in the desired ratio and a suitable thixotropic agent, fed from line 16, is intimately admixed therewith. The viscosity of Mix A, however, is relatively low, preferably not greater than 50,000 centipoises at 25° C., so that the mix can be pumped to the next station in the process. Where desired, a filler and other additives may be incorporated into Mix A.

In vessel 18, the curing agent (e.g. a boron trifluoride amine complex) is dissolved in a polyfunctional hydroxylic solvent, such as glycerine, to form Mix B. Mix A and Mix B are then fed via lines 20 and 22, respectively, to mixer 24, where the two are intimately admixed. It will be observed that both mixes have a relatively low viscosity and therefore can be readily pumped and metered in high volume and with automated equipment. In mixer 24, the thixotropic agent interacts or coacts with the polyfunctional hydroxylic solvent thereby increasing substantially the viscosity of the resulting resin compound so as not to run when applied. This cement is then dispensed through nozzle 26 onto part 28 passing on conveyor belt 30, and a second part 32 is bonded thereto. The gelation time is predetermined so that when the conjoined article is removed from the belt, the two parts are bonded so as to be able to withsatnd additional handling.

A filler may be admixed with the resin compound to improve the physical properties and/or thermal conductivity of cement. Suitable fillers may include, for example, tabular alumina, silica flour, kaolin, talc, and carbon black, and the quantity used may range from about 30 to 65 percent by weight of Mix A (described above). If larger quantities are used, the mix cannot be properly pumped. In the preferred embodiment of the invention, tabular alumina having a particle size of 100 to 325 mesh is used because it improves the thermal conductivity of the cement. The epoxy resins have a particularly high tolerance level for tabular alumina, and therefore the quantity may range from about 55 to 65 percent by weight.

In the following Examples 1–6, which further illustrate my invention, the resin mixtures were prepared by admixing the two types of resins in different ratios (see Table I below) together with three grams of pyrogenic silica and fifty grams of tabular alumina (grade T–60). The diglycidyl ether of polyhydric phenol in Examples 1–3 was Epon 828 and in Examples 4–6 was Epon 815 (both of Shell Chemical Corp.). Epon 828 has a viscosity of 100–160 poises at 25° C. and an epoxide equivalent of 180–195, and Epon 815 has a viscosity of five to nine poises at 25° C. and an epoxide equivalent of 175–195. The cycloaliphatic polyepoxy resin was 1-hydroxymethyl-3,4-oxa-6 methyl cyclohexane (Araldite CY–178).

Two different curing agents dissolved in glycerine were used. These were prepared as follows:

(A) A 15 percent solution in glycerine of the boron trifluoride complex with m-chloroaniline was prepared by adding 10.9 grams of boron trifluoride etherate to a stirred solution of 9.8 grams of m-chloroaniline in 85 grams of glycerine. The rate of addition was adjusted to maintain a temperature of about 30 to 35° C. The flask containing the mixture was cooled as needed in a water bath. At the end of the addition, the diethyl ether was essentially removed by evaporation under reduced pressure until boiling had ceased. This curing agent is identified in Table II below as XL–A.

(B) A 40 percent solution in glycerine of the boron trifluoride complex with aniline was prepared by adding 33.9 grams of boron trifluoride etherate to a stirred solution of 23.8 grams of aniline in 60 grams of glycerine by the same procedure as described in A above. This curing agent is identified in Table II as XL-B.

For each example, a twenty-gram sample of the resin mixture was thoroughly admixed with the curing agent in glycerine. The viscosities before and immediately after mixing were measured on a Brookfield Viscometer No. 6 Spindle, and are given in Table I. The Thixotropic Index is obtained by dividing the viscosity at 5 r.p.m. by the viscosity at 100 r.p.m. This index shows a very substantial increase in thixotropy immediately upon mixing and further the high index value shows that the resulting compound will not run from its applied position.

TABLE I

Viscosities at 25° C. before and after adding curing agent in glycerine

| Resin system | Viscosity before | | Thixo-tropic index before | Viscosity after | | Thixo-tropic index after |
|---|---|---|---|---|---|---|
| | Cps. at 5 r.p.m. | Cps. at 100 r.p.m. | | Cps. at 5 r.p.m. | Cps. at 100 r.p.m. | |
| Example: | | | | | | |
| 1 | 96,000 | 75,200 | 1.27 | 1,152,000 | 156,800 | 7.4 |
| 2 | 54,400 | 48,800 | 1.11 | 1,152,000 | 134,400 | 8.6 |
| 3 | 115,200 | 94,400 | 1.22 | 768,000 | 112,000 | 6.9 |
| 4 | 25,600 | 20,800 | 1.23 | 268,800 | 32,000 | 8.4 |
| 5 | 28,800 | 26,240 | 1.10 | 960,000 | 86,400 | 11.4 |
| 6 | 38,400 | 35,600 | 1.08 | 1,344,000 | 89,600 | 15.0 |

Figure 2:
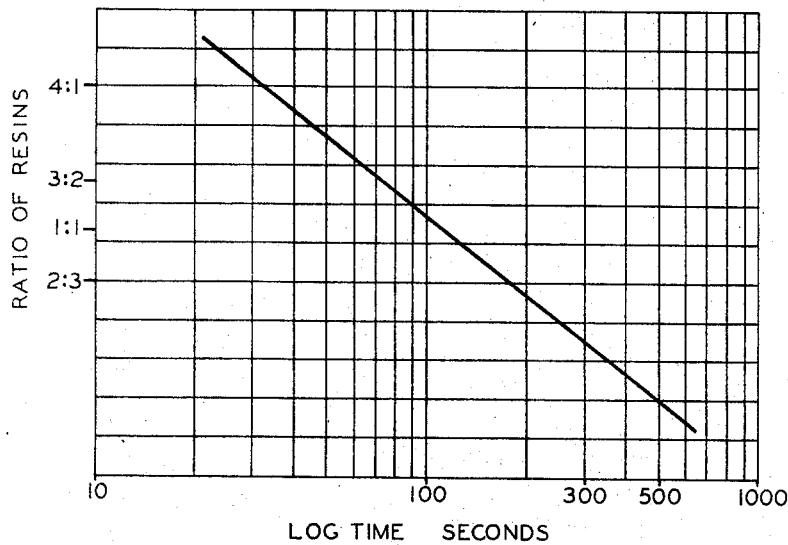
Figure 3:
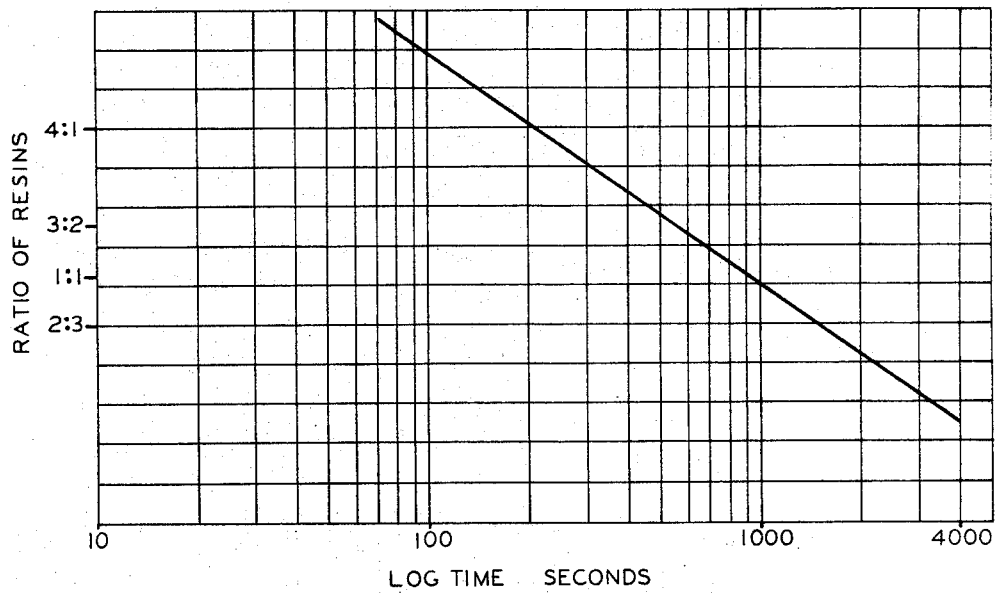
Figure 4:
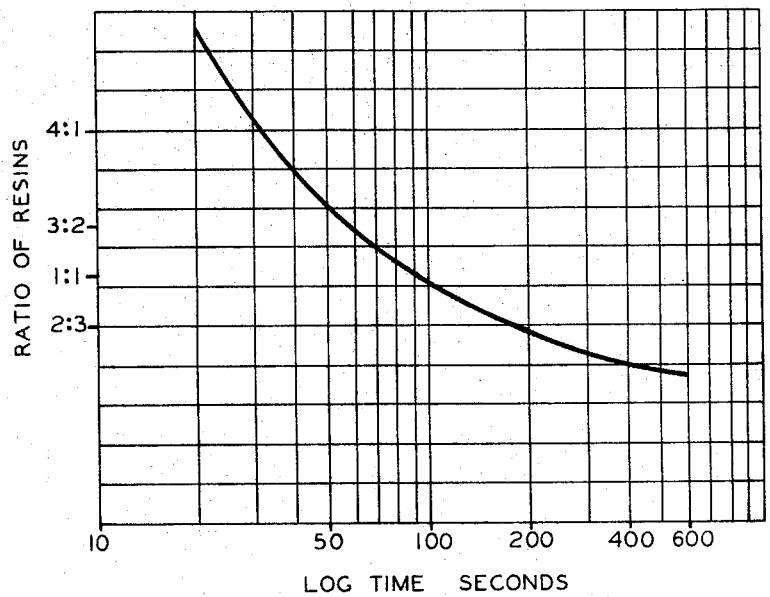
Figure 5:
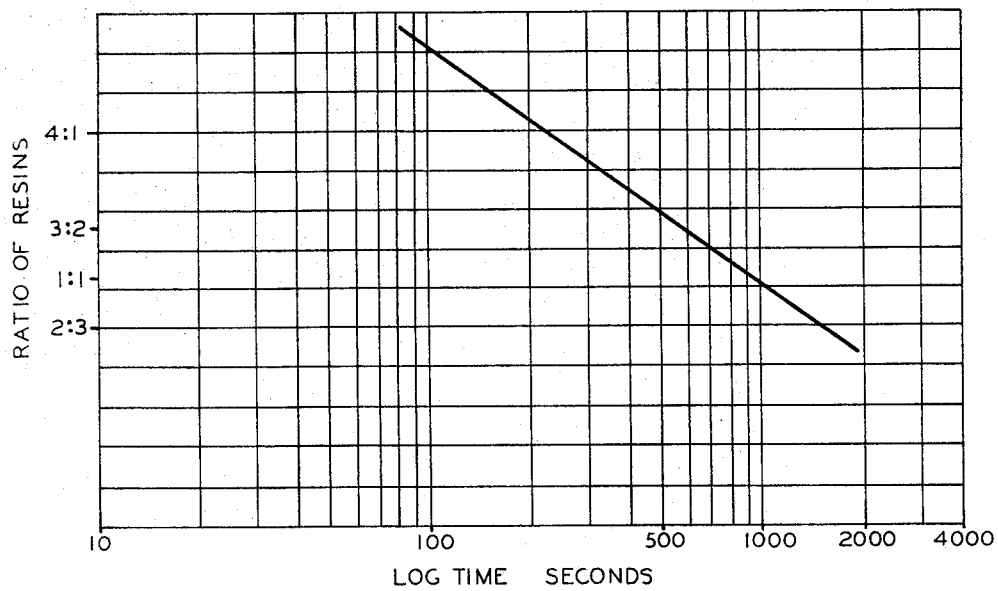

Table II shows the gelation time for the resin compound. It will be observed from the table that the gelation time varies with the ratio of the two resins. This is shown by the graphs in FIGS. 2 through 5 where the ratio is plotted against the log time in seconds. The gelation times for Examples 1–3 (using Epon 828) are shown in FIGS. 2 and 3 using XL-A and XL-B, respectively, as the curing agent. Similarly, the gelation times for Examples 4–6 (using Epon 815) are shown in FIGS. 4 and 5 using XL-A and XL-B, respectively, as the curing agent. When the ratio of cycloaliphatic polyepoxy resin to diglycidyl ether of polyhydric phenols is high, as in Examples 2 and 5 where the ratio is 4:1, the gelation time is relatively faster.

TABLE II

Gelation time at room temperature

| Resin | Ratio of araldite resin to epon resin | Gelation time, seconds | |
|---|---|---|---|
| | | XL-A | XL-B |
| Example: | | | |
| 1 | 1:1 | 111 | 900 |
| 2 | 4:1 | | 228 |
| 3 | 2:3 | 181 | 1,545 |
| 5 | 1:1 | 85 | 1,020 |
| 5 | 4:1 | 30 | 231 |
| 6 | 2:3 | 187 | 1,576 |

Thus, the gelation time may be adjusted continuously by adjusting the ratio of the two resins. In production operations, the desired conditions may be ascertained readily by the operator upon quick reference to the graph. This is of considerable advantage in that changes in extraneous conditions, such as conveyor speed specifications, variability in metering and dispensing the ingredients and compound, etc., can be readily adjusted for, and further obviates the need for changing the curing agent. In high volume production with automated equipment, it is exceedingly advantageous to be able to adjust continuously the gelation time.

I claim:

1. A cured composition prepared by mixing:
   (a) a first component having a low viscosity relative to the final viscosity of said composition comprising a glycidyl ether of a polyhydric phenol and a cycloaliphatic polyepoxy resin in the ratio of 1:4 to 3:2, and a thixotropic agent; and
   (b) a second component, comprising a boron trifluoride amine complex curing agent dissolved in a polyfunctional hydroxylic solvent, in sufficient quantity to polymerize said first component.

2. The epoxy composition of claim 1 wherein said thixotropic agent is pyrogenic silica.

3. The epoxy compound of claim 1 wherein said polyfunctional hydroxylic solvent is glycerine.

4. The epoxy composition of claim 1 wherein the glycidal ether of polyhydric phenols comprises the reaction product between epichlorohydrin and bisphenol A.

5. The epoxy composition of claim 1 wherein cycloaliphatic polyepoxy resin is 1-hydroxmethyl-3,4-oxa-6-methyl cyclohexane.

6. The epoxy composition according to claim 1 wherein said boron trifluoride amine complex comprises the boron trifluoride complex with aniline.

7. The epoxy composition according to claim 1 wherein said boron trifluoride amine complex comprises the boron trifluoride complex with m-chloroaniline.

8. The epoxy composition according to claim 1 wherein said first component also includes about 30 to 65 percent by weight of a filler.

9. The epoxy composition according to claim 1 wherein said first component includes about 55 to 65 percent by weight tabular alumina.

10. A cured composition prepared by mixing:
    (a) a first component having a low viscosity relative to said composition comprising (1) the reaction product of epichlorohydrin and bisphenol A and (2) a cycloaliphatic polyepoxy resin, the ratio of (1) to (2) being in the range of 1:4 to 3:2, (3) pyrogenic silica, and (4) from about 55 to 65%, by weight, tabular alumina; and
    (b) a second component, comprising a boron trifluoride amine complex curing agent dissolved in glycerine, the amount of said second component being sufficient to polymerize the epoxy constituents of said first component.

11. A process for producing an epoxy composition, curable at room temperature, comprising:
    (a) preparing a first component by mixing a glycidyl ether of a polyhydric phenol with a cycloaliphatic polyepoxy resin in the ratio of 1:4 to 3:2, and adding to the resulting admixture a thixotropic agent, whereby said first component has a low viscosity relative to said final compostion;
    (b) dissolving a boron trifluoride amine complex curing agent in a polyfunctional hydroxylic solvent; and
    (c) mixing the boron trifluoride amine complex-polyfunctional hydroxylic solvent solution with the first component in an amount sufficient to polymerize said first component, whereby a composition is formed which is thixotropic due to coaction of the solvent with the thixotropic agent, and has a gelation time which can be adjusted continuously by adjustment of said ratio of said first component.

12. The process according to claim 11 wherein said thixotropic agent is pyrogenic silica.

13. The process according to claim 11 wherein said polyfunctional hydroxylic solvent is glycerine.

14. The process according to claim 11 wherein said glycidyl ether of polyhydric phenols comprises the reaction product between epilchlorohydrin and bisphenol A.

15. The process according to claim 11 wherein said cycloaliphatic polyepoxy resin is 1-hydroxmethyl-3,4-oxa-6 methyl cyclohexane.

16. The process according to claim 11 wherein said borontrifluoride amine complex comprises the boron trifluoride complex with aniline.

17. The process according to claim 11 wherein said boron trifluoride amine complex comprises the boron trifluoride complex with m-chloroaniline.

18. The process according to claim 11 which includes adding to the first component of step (a) 30 to 65 percent by weight of a filler.

19. The process according to claim 11 which includes adding to the first component of step (a) 55 to 65 percent by weight of tabular alumina.

20. A process for producing a composition, curable at room temperature, comprising:
(a) preparing a first component comprising the reaction product of epichlorohydrin and bisphenol A, and a cycloaliphatic polyepoxy resin, in the ratio of 1:4 to 3:2, and adding to the resulting admixture pyrogenic silica and 55 to 65%, by weight, tabular alumina, whereby said first component has a low viscosity relative to said final composition;
(b) dissolving a boron trifluoride amine complex curing agent in glycerine; and
(c) admixing the boron trifluoride amine complex curing agent-glycerine solution with said first component in an amount sufficient to polymerize the epoxy components of said first component, whereby a composition is formed which is thixotropic due to co-action of the solvent with the thixotropic agent, and has a gelation time which can be adjusted continuously by adjustment of said ratio of said first component.

References Cited
UNITED STATES PATENTS

| | | | |
|---|---|---|---|
| 3,100,756 | 8/1963 | Fry | 260—830 TW |
| 3,218,369 | 11/1965 | Hinkley | 260—830 TW |
| 3,282,863 | 11/1966 | Carey et al. | 260—830 TW |
| 3,294,863 | 12/1966 | De Acetis et al. | 260—830 TW |
| 3,379,653 | 4/1968 | Ernst et al. | 260—830 TW X |
| 3,196,120 | 7/1965 | McLaughlin et al. | 260—33.4 Ep X |

LEWIS T. JACOBS, Primary Examiner

U.S. Cl. X.R.

260—830